(12) United States Patent  
Sugimoto

(10) Patent No.: US 7,596,976 B2
(45) Date of Patent: Oct. 6, 2009

(54) ELECTRIC STEERING LOCK DEVICE

(75) Inventor: Koichiro Sugimoto, Yokohama (JP)

(73) Assignee: Alpha Corporation, Yokohama-Shi (JP)

( * ) Notice: Subject to any disclaimer, the term of this patent is extended or adjusted under 35 U.S.C. 154(b) by 0 days.

(21) Appl. No.: 12/292,653

(22) Filed: Nov. 24, 2008

(65) Prior Publication Data

US 2009/0139284 A1 Jun. 4, 2009

(51) Int. Cl.
*B60R 25/02* (2006.01)
(52) U.S. Cl. .......................................... 70/186; 70/252
(58) Field of Classification Search .......... 70/182–189, 70/252
See application file for complete search history.

(56) References Cited

U.S. PATENT DOCUMENTS

| 6,915,671 | B2 * | 7/2005 | Zillmann | 70/186 |
| 7,021,093 | B2 * | 4/2006 | Fukatsu et al. | 70/186 |
| 7,055,351 | B2 * | 6/2006 | Suzuki et al. | 70/186 |
| 7,121,126 | B2 * | 10/2006 | Zillmann | 70/186 |
| 7,412,858 | B2 * | 8/2008 | Tsukano et al. | 70/186 |
| 2004/0107750 | A1 * | 6/2004 | Fukushima | 70/186 |
| 2005/0034493 | A1 * | 2/2005 | Wittwer et al. | 70/186 |
| 2006/0005588 | A1 * | 1/2006 | Okuno | 70/186 |
| 2007/0113604 | A1 * | 5/2007 | Khoury et al. | 70/186 |
| 2008/0087056 | A1 * | 4/2008 | Tsukazaki | 70/182 |
| 2008/0178644 | A1 * | 7/2008 | Okuno et al. | 70/187 |
| 2008/0271504 | A1 * | 11/2008 | Okada et al. | 70/252 |

FOREIGN PATENT DOCUMENTS

| DE | 103 56 660 A1 | 7/2005 |
| EP | 1 724 165 A1 | 11/2006 |
| JP | 2006-044573 | 2/2008 |

* cited by examiner

*Primary Examiner*—Suzanne D Barrett
(74) *Attorney, Agent, or Firm*—The Nath Law Group; Jerald L. Meyer; Robert T. Burns

(57) ABSTRACT

An electric steering lock device of the invention includes: a rotating body (worm wheel) that is driven by a motor to rotate in an unlocking direction and a locking direction; a first cam section and a second cam section provided in the worm wheel; a lock member that follows the first cam section to be displaced between a lock position and an unlock position; and a lever member that follows the second cam section and that is positioned, when the lock member is positioned at the unlock position, at a waiting position at which the lock member is allowed to move, and that is positioned, when the lock member is moved to the lock position, at a retention position at which the lock member is blocked from moving to the unlock position.

7 Claims, 15 Drawing Sheets

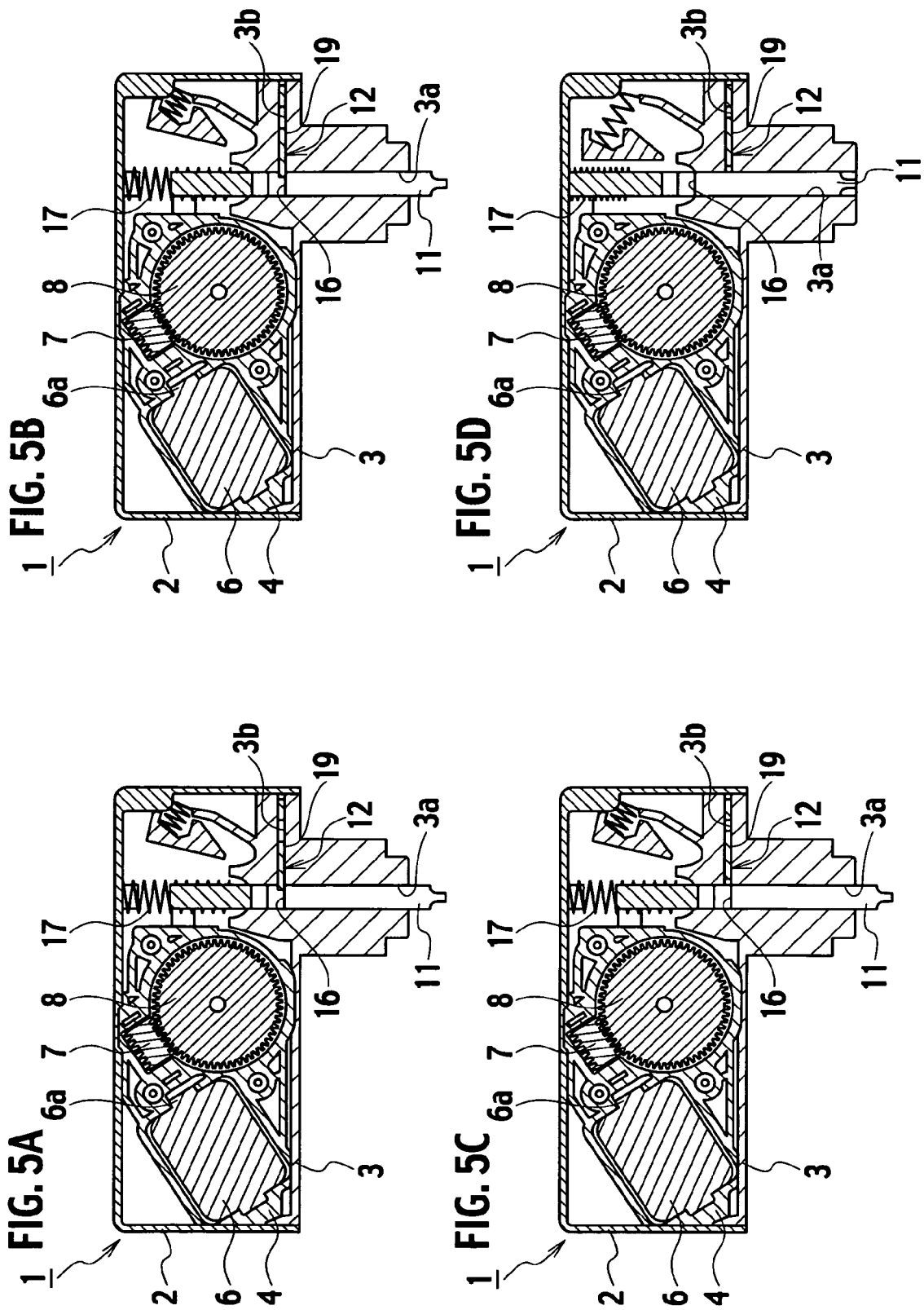

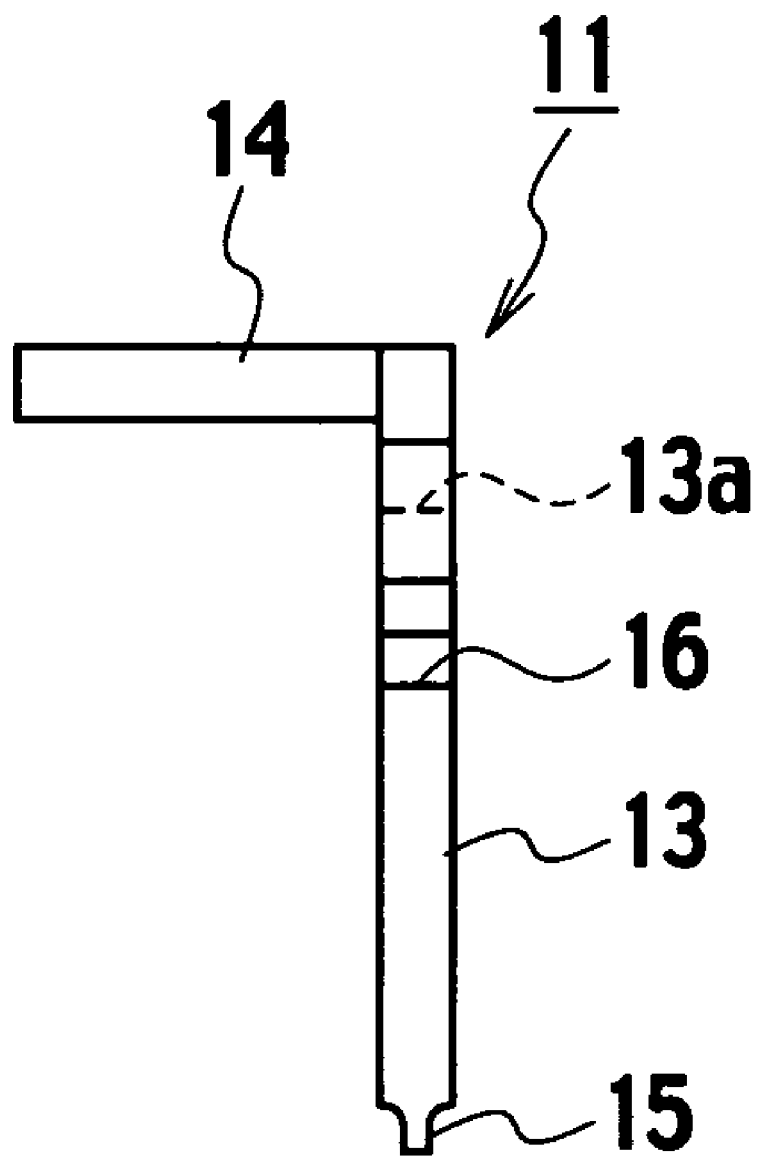

ELECTRIC STEERING LOCK DEVICE

BACKGROUND OF THE INVENTION

1. Field of the Invention

The present invention relates to an electric steering lock device that locks the rotation of a steering shaft of a vehicle.

2. Description of the Related Art

This type of conventional electric steering lock device is disclosed in Patent Publication 1. As shown in FIG. 1, this electric steering lock device 100 includes: a lock member 103 that is urged by a first coil spring 101 in a direction of a steering shaft 102 of a vehicle and that can be engaged with the steering shaft 102; a rotating body 106 that is connected to and driven by the motor 104 and that has a cam groove 105; a pin 107 that is moved along the cam groove 105 by the rotation of the rotating body 106 to move the lock member 103 between the lock position and the unlock position; and a lock stopper 109 that is moved in conjunction with the operation of the pin 107 and that is urged by a second coil spring 108 in a direction of the lock member 103. When the lock member 103 is moved from the unlock position to the lock position in conjunction with the operation of the pin 107, the lock stopper 109 is engaged with a part of the lock member 103. This regulates the movement of the lock member 103 in the unlock direction.

When the above configuration is used to rotate the motor 104 in the locking direction during a parking operation, the rotating body 106 is rotated in the locking direction by the driving force by the motor 104. At the same time, the pin 107 oscillates within the cam groove 105 in accordance with the rotation of the rotating body 106. As a result, the lock member 103 is moved from the unlock position to the lock position. Then, the lock stopper 109 regulates the movement of the lock member 103 in the unlock direction. Consequently, the tip end of the lock member 103 is engaged with the steering shaft 102, thus blocking the rotation of the steering shaft 102. Thus, the vehicle cannot be maneuvered.

When the motor 104 is subsequently rotated in the unlocking direction, the driving force of the motor 104 causes the rotating body 106 to be rotated in the unlocking direction. At the same time, the pin 107 is oscillated within the cam groove 105 in accordance with the reverse rotation of the rotating body 106. This consequently cancels the regulation of the movement of the lock member 103 by the lock stopper 109. Then, the lock member 103 is moved from the lock position to the unlock position. Then, the engagement of the tip end of the lock member 103 with the steering shaft 102 is cancelled, thus allowing the steering shaft 102 to be rotated freely. Thus, the vehicle can be maneuvered.

[Patent Publication 1] Japanese Patent Laid-Open Publication No. 2006-44573

SUMMARY OF THE INVENTION

In the case of the conventional electric steering lock device 100, when a vehicle is parked, the lock member 103 is arranged to block the rotation of the steering shaft 102 to keep the vehicle in a state that the vehicle cannot be maneuvered so that the parked vehicle is prevented from being stolen. However, the conventional electric steering lock device 100 had a risk of a so-called soft attack where a small through hole is opened in the cover for example of the electric steering lock device 100 and the lock member 103 is directly operated through this hole to move the lock member 103 to the unlock position side, which forcedly cancels the locked status of the steering shaft 102, causing a steal of a parked vehicle.

In view of the above, it is an objective of the present invention to provide an electric steering lock device that can block the lock member, which is engaged with the steering shaft in a locked status, to move to the unlocking direction so that the parked vehicle can be prevented from being stolen.

An electric steering lock device according to a first aspect of the present invention includes: a rotating body that is driven by a driving source to rotate in an unlocking direction and a locking direction; a first cam section and a second cam section provided in the rotating body; a lock member that follows the first cam section to be displaced between a lock position at which the rotation of a steering shaft is blocked and a unlock position at which the rotation of the steering shaft is allowed; a housing and a cover that form a part accommodation room for accommodating the rotating body, the first cam section, the second cam section, and the lock member; and a lever member that slides, while following the second cam section, so as to be able to be engaged with or disengaged from the lock member. The lever member is structured to be positioned, when the lock member is positioned at the unlock position, at a waiting position at which the lock member is allowed to move, and to be positioned, when the lock member is positioned at the lock position, at a retention position at which the lock member is blocked from being moved to the unlock position.

When the locked status is cancelled in the configuration as described above, the rotating body is firstly driven by the driving source to rotate in the unlocking direction. Then, the first cam section and the second cam section provided in the rotating body are moved in conjunction with this movement. Then, the lever member follows the second cam section and is moved to the waiting position at which the lock member is allowed to move. The lock member follows the first cam section and is displaced from the lock position to the unlock position. As a result, the steering shaft is allowed to rotate and the vehicle can be maneuvered. When locking on the other hand, the rotating body is driven by the driving source to rotate in the locking direction. Then, the lock member follows the first cam section and is displaced from the unlock position to the lock position. Then, the lever member follows the second cam section and is moved to the retention position at which the lock member is blocked from moving to the unlock position. As a result, the steering shaft is blocked by the lock member from rotating and the vehicle cannot be maneuvered. Thus, when locking the lever member is engaged with the lock member fitted to the steering shaft. Therefore, even when someone tries to forcedly draw the lock member in the unlocking direction, the lock member is prevented from moving in the unlocking direction. This prevents the parked vehicle from being stolen.

The lock member also may include a lock retention engagement groove that extends in a direction orthogonal to a direction along which the lock member is moved. The lever member also may include an engagement piece that is engaged with the lock retention engagement groove when the lock member is positioned at the lock position and the lever member is positioned at a retention position.

When the locked status is cancelled in the configuration as described above, the lever member follows the second cam section provided in the rotating body and is moved to the waiting position at which the lock member is allowed to move. Then, the engagement piece of the lever member is disengaged from the lock retention engagement groove of the lock member. Consequently, the lock member follows the first cam section and can be moved from the lock position to the unlock position. When locking on the other hand, the lock member follows the first cam section and is displaced from the unlock position to the lock position. Then, the lever member follows the second cam section and is moved to the retention position. As a result, the engagement piece of the lever member is engaged with the lock retention engagement groove of the lock member and the lock member is blocked to move from the lock position to the unlock position.

The housing also may include a through hole to which the lock member can be inserted in a retractable manner.

By the configuration as described above, the lock member is firmly supported and can be protected from a destructive behavior where the lock member is operated from the outside to forcedly unlock the lock member.

The lever member also may be covered by the housing.

By the configuration as described above, the lever member can be protected from a destructive behavior where the lever member is operated from the outside to forcedly unlock the lever member.

The electric steering lock device according to the first aspect of the present invention also may further include a drive unit housing and a drive unit cover forming a drive unit room for accommodating the rotating body.

By the configuration as described above, the rotating body (worm wheel) is covered by the drive unit housing and the drive unit cover. Thus, the worm wheel can be blocked from being detached from the outside and is protected from a destructive behavior for forced unlocking.

An electric steering lock device according to a second aspect of the present invention includes: a rotating body that is driven by a driving source to rotate in an unlocking direction and a locking direction; a first cam section and a second cam section provided in the rotating body; a lock member that follows the first cam section to be displaced between a lock position at which the rotation of a steering shaft is blocked and an unlock position at which the rotation of the steering shaft is allowed; a housing and a cover that form a part accommodation room for accommodating the rotating body, the first cam section, the second cam section, and the lock member; and a lever member that slides, while following the second cam section, so as to be able to be engaged with or disengaged from the lock member. The lever member is structured to be positioned, when the lock member is positioned at the unlock position or the lock position, at a retention position at which the lock member is blocked from being moved to the unlock position, and to be positioned, when the lock member is located between the unlock position and the lock position, at a waiting position at which the lock member is allowed to move.

In such a configuration, the lever member is engaged with the lock member which is fitted into the steering shaft when the steering shaft is locked. Accordingly, the lock member is prevented from moving toward the unlock position even if the lock member is forcibly pulled to the unlock position, thus a parked vehicle can be prevented from being stolen. Moreover, the lever member is engaged with the lock member which is positioned at the unlock position when the steering shaft is unlocked. Accordingly, it is possible to provide a fail-safe feature preventing the lock member from moving to the unlocking position in a state where the steering shaft needs to remain unlocked, such as in a driving vehicle.

The lock member also may include a lock retention engagement groove and an unlock retention engagement groove which are extending in a direction orthogonal to a moving direction of the lock member. The lever member also may include an engagement piece which is engaged with the lock retention engagement groove or the unlock retention engagement groove when the lock member is positioned at the lock position or the unlocking position and when the lever member is positioned at the retention position.

In such a configuration, the lever member follows the second cam section provided in the rotating body and moves to the waiting position at which the lever member allows movement of the lock member during a transition from the locking state to the unlocking state and a transition from the unlocking state to the locking state. Then, the engagement piece of the lever member is disengaged from the unlock retention engagement groove or the lock retention engagement groove. Therefore, the lock member follows the first cam section and can be moved from the lock position to the unlock position or from the unlock position to the lock position. On the other hand, when the steering shaft is locked or unlocked, the lock member follows the first cam section and is displaced to the unlock position or the lock position. The lever member follows the second cam section and moves to the retention position. Then, the engagement piece of the lever member is engaged with the lock retention engagement groove or the unlock retention engagement groove of the lock member. Therefore, the lock member is prevented from moving from the lock position to the unlock position.

BRIEF DESCRIPTION OF THE DRAWINGS

FIG. 4A is a cross-sectional view illustrating a locked status. FIG. 4B is a cross-sectional view illustrating a status where an operation of a lever member is started. FIG. 4C is a cross-sectional view illustrating a status where an operation of a lock member is started. FIG. 4D is a cross-sectional view illustrating an unlocked status.

FIGS. 5A to 5D are cross-sectional views illustrating the first embodiment of the present invention taken along a line 5-5 of FIG. 2. FIG. 5A is a cross-sectional view illustrating the locked status. FIG. 5B is a cross-sectional view illustrating the status where the operation of the lever member is started. FIG. 5C is a cross-sectional view illustrating the status where the operation the lock member is started. FIG. 5D is a cross-sectional view illustrating the unlocked status.

FIG. 6A is a cross-sectional view illustrating the locked status. FIG. 6B is a cross-sectional view illustrating the status where the operation of the lever member is started. FIG. 6C is a cross-sectional view illustrating the status where the operation of the lock member is started. FIG. 6D is a cross-sectional view illustrating the unlocked status.

FIG. 7A is a cross-sectional view illustrating the locked status. FIG. 7B is a cross-sectional view illustrating the status where the operation of the lever member is started. FIG. 7C is a cross-sectional view illustrating the status where the operation of the lock member is started. FIG. 7D is a cross-sectional view illustrating the unlocked status.

FIG. 8 is a front view illustrating the lock member provided in the electric steering lock device according to the first embodiment of the present invention.

FIG. 13A is a cross-sectional view illustrating a locked status. FIG. 13B is a cross-sectional view illustrating a status where an operation of a lock member is started. FIG. 13C is a cross-sectional view illustrating an unlocked status.

FIG. 14A is a cross-sectional view illustrating the locked status. FIG. 14B is a cross-sectional view illustrating the status where the operation of the lock member is started. FIG. 14C is a cross-sectional view illustrating the unlocked status.

FIG. 15A is a cross-sectional view illustrating the locked status. FIG. 15B is a cross-sectional view illustrating the status where the operation of the lock member is started. FIG. 15C is a cross-sectional view illustrating the unlocked status.

FIG. 16A is a cross-sectional view illustrating the locked status. FIG. 16B is a cross-sectional view illustrating the status where the operation of the lock member is started. FIG. 16C is a cross-sectional view illustrating the unlocked status.

DETAILED DESCRIPTION OF THE PREFERRED EMBODIMENT

The following section will describe embodiments of the present invention with reference to the drawings. FIGS. 2 to 10 illustrate a first embodiment of the present invention.

Figure 1:
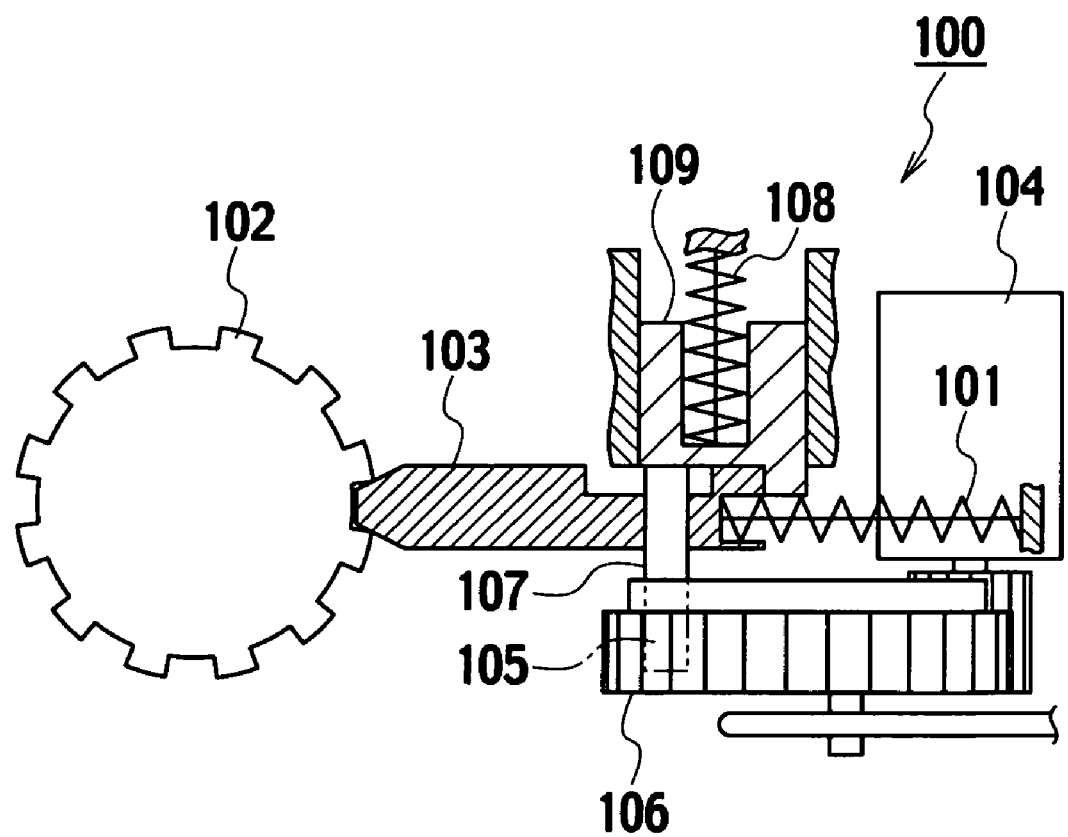
FIG. 1 illustrates an electric steering lock device of a conventional example.
Figure 2:
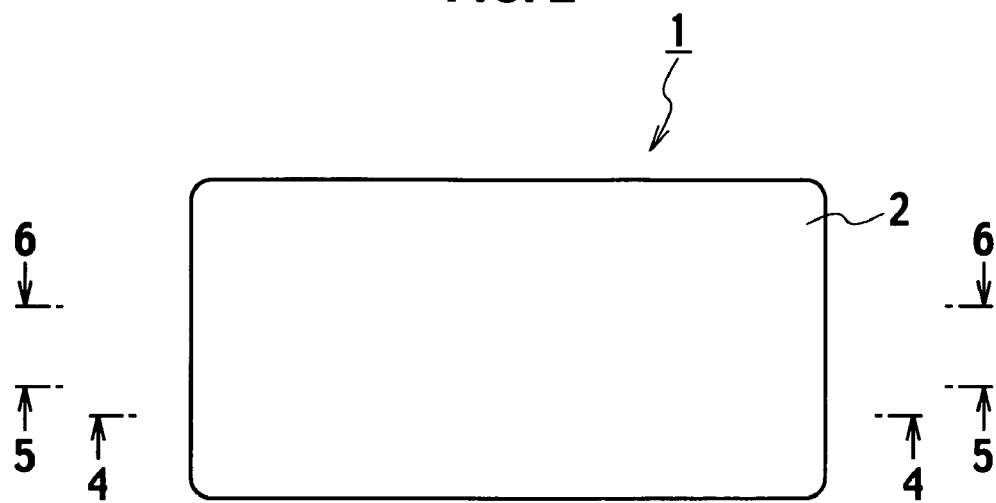
FIG. 2 is a top view illustrating an electric steering lock device according to a first embodiment of the present invention.
Figure 3:
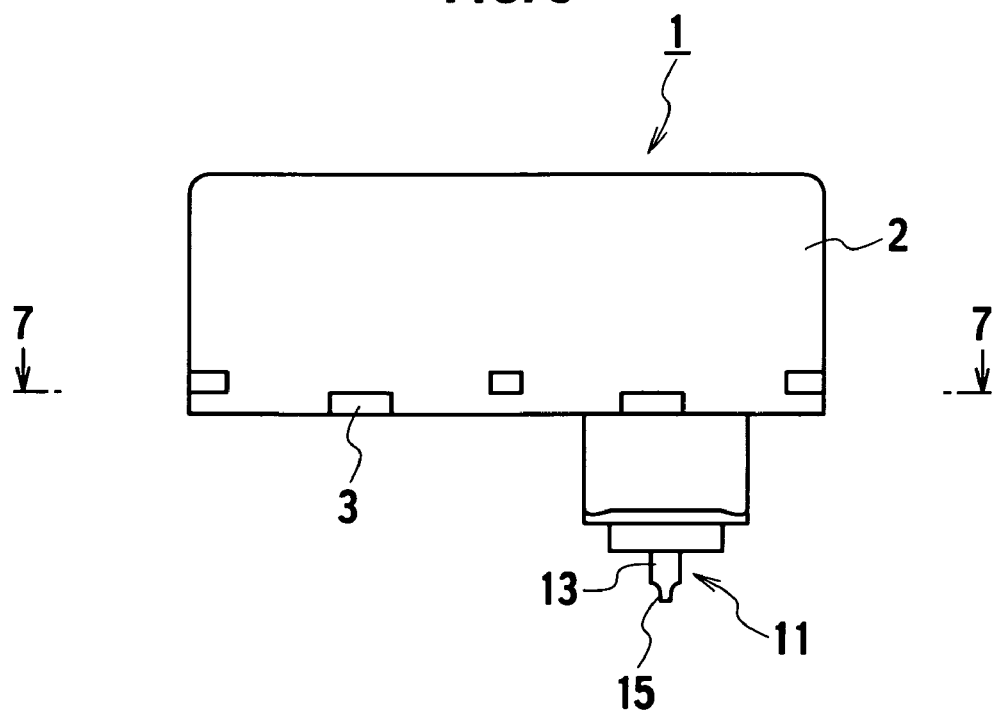
FIG. 3 is a front view illustrating the electric steering lock device according to the first embodiment of the present invention.
Figure 4A:
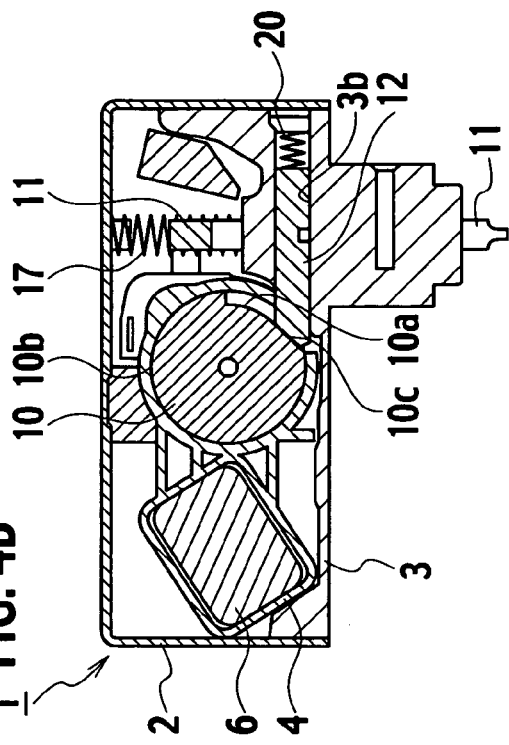
FIGS. 4A to 4D are cross-sectional views illustrating the first embodiment of the present invention taken along a line 4-4 of FIG. 2.
Figure 4B:
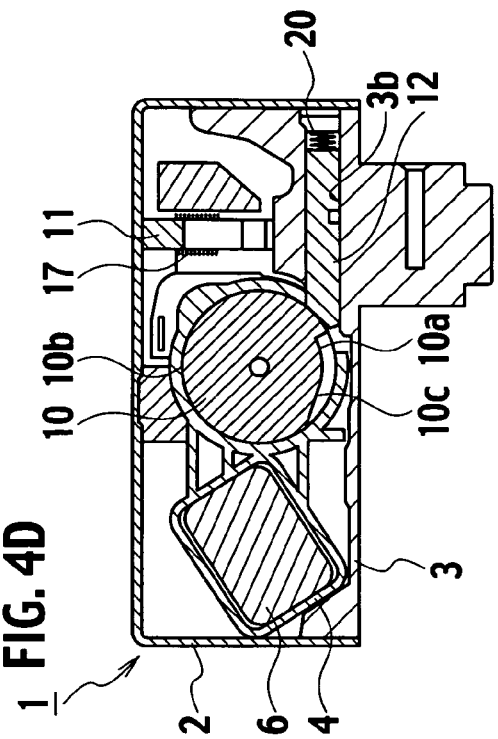
Figure 4C:
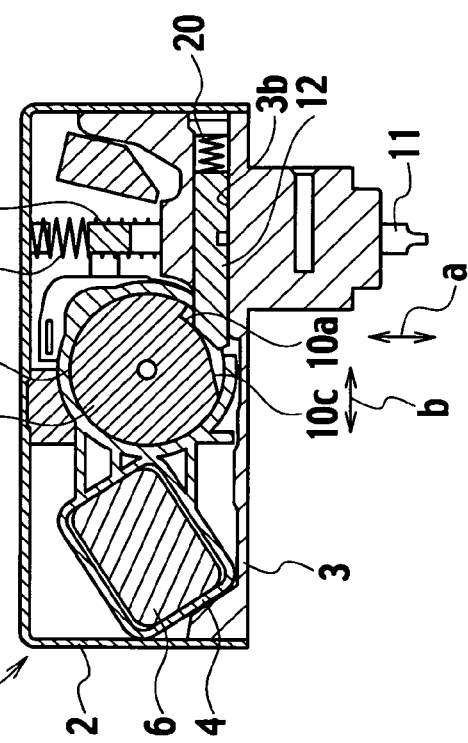

As shown in FIGS. 2 to 10, a electric steering lock device 1 includes, as main configuration parts, a cover 2 and a housing 3 that are assembled to each other to form a part accommodation room at the interior thereof; a drive unit housing 4 and a drive unit cover 5 that are accommodated in the part accommodation room and that further form a drive unit room at the interior thereof; a motor 6 that is a driving source provided in the drive unit room; a worm gear 7 that is fixed to a rotation axis 6a of the motor 6; a rotating body (worm wheel) 8 that is meshed with the worm gear 7 and that is rotatably supported in the drive unit room; a first cam section 9 that is integrated with one face of the worm wheel 8; a second cam section 10 that is integrated with the other face of the worm wheel 8; a lock member 11 that slides in a direction shown by a arrow a in FIG. 4A, following the first cam section 9; a lever member 12 that slides in a direction shown by the arrow b in FIG. 4A, following the second cam section 10; and a circuit substrate (not shown) provided in the part accommodation room.

As shown in FIGS. 6A to 6D, a cam profile of the first cam section 9 is divided to a lock position area 9a (bottom dead point area) which disposes the lock member 11 in a lock position; a unlock position area 9b (top dead point area) which disposes the lock member 11 in an unlock position; and an elevation area 9c between the lock position area 9a and the unlock position area 9b. Similarly, a cam profile of the second cam section 10 is also divided, as shown in FIGS. 4A to 4D, to a retention position area 10a which disposes the lever member 12 in a retention position; a waiting position area 10b which disposes the lever member 12 in a waiting position; and a lifting area 10c between the retention position area 10a and the waiting position area 10b.

Figure 4D:
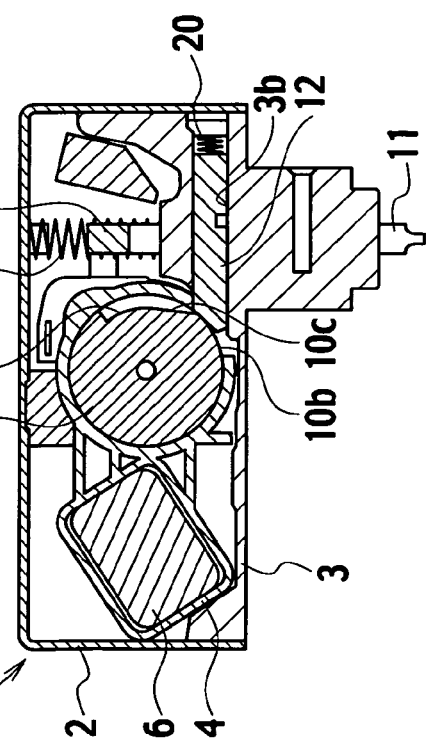
Figure 6A:
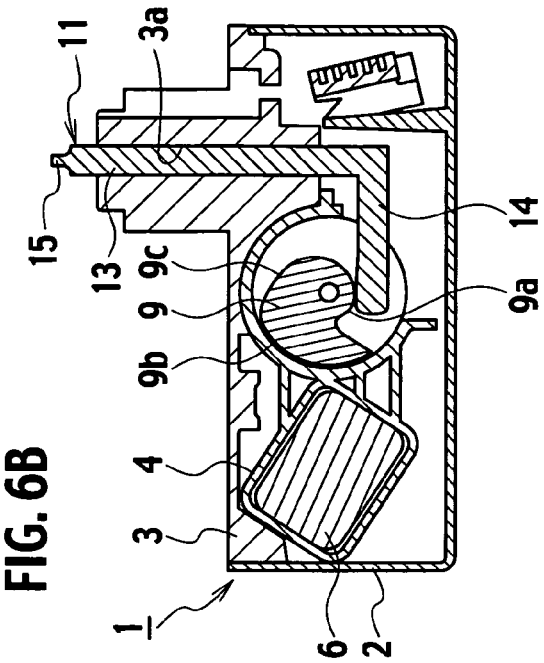
FIGS. 6A to 6D are cross-sectional views illustrating the first embodiment of the present invention taken along a line 6-6 of FIG. 2.
Figure 6B:
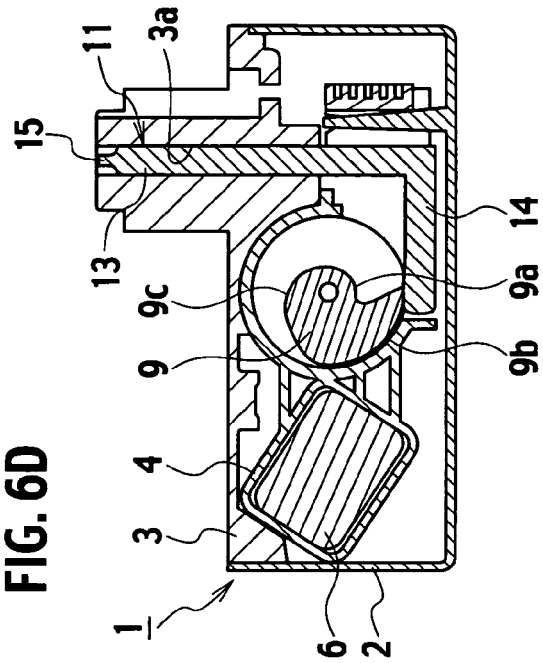
Figure 6C:
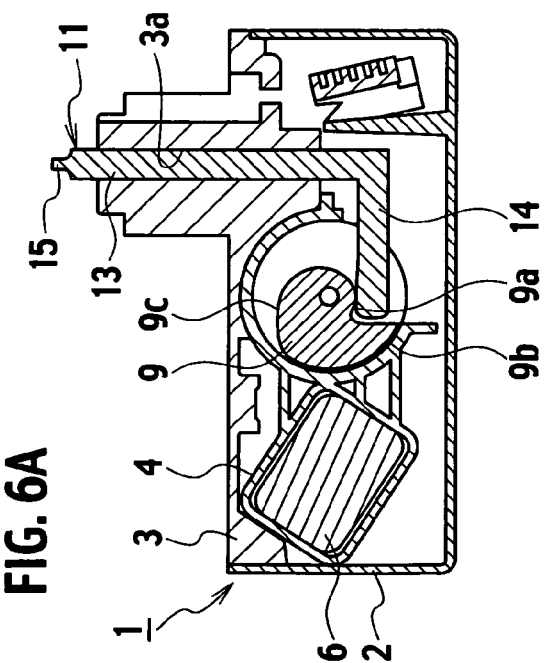
Figure 6D:
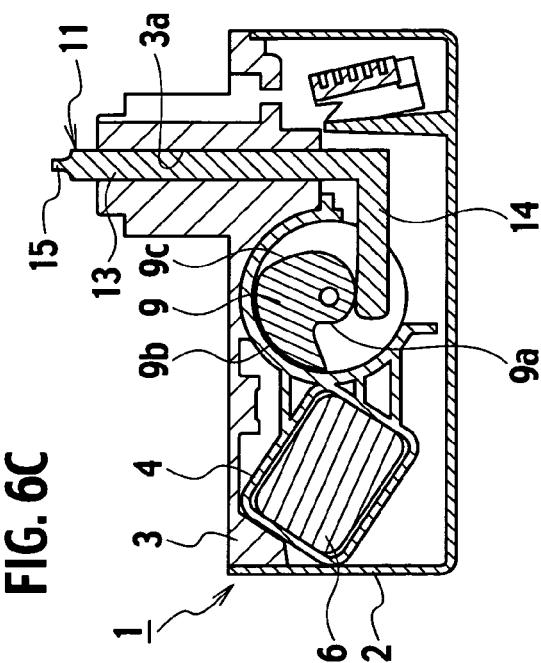
Figure 7A:
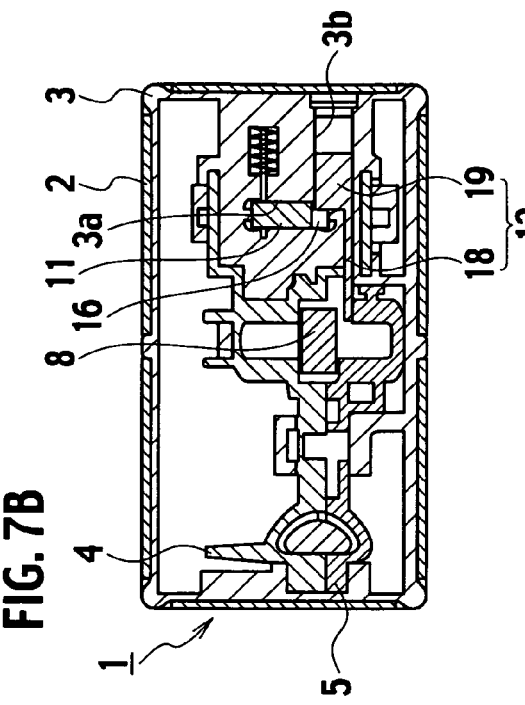
FIGS. 7A to 7D are cross-sectional views illustrating the first embodiment of the present invention taken along a line 7-7 of FIG. 3.
Figure 7B:
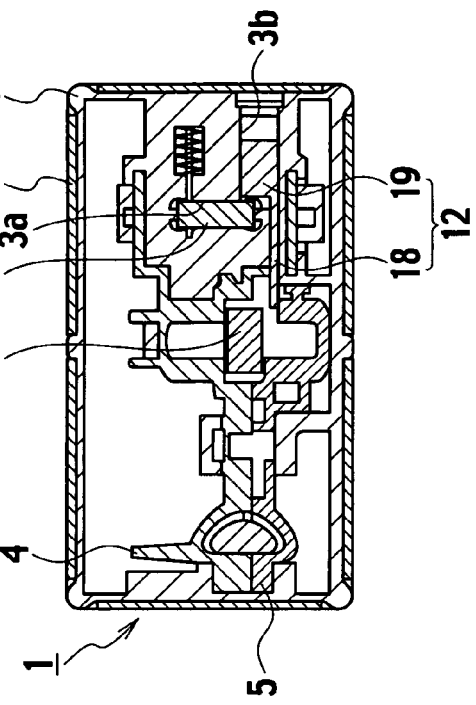
Figure 7C:
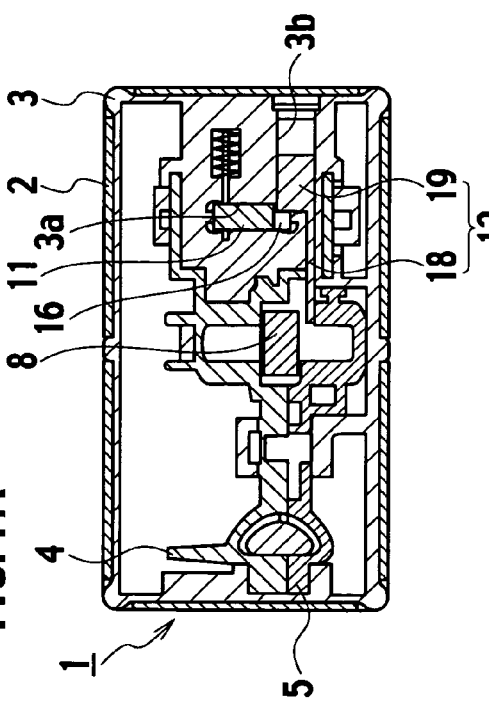
Figure 7D:
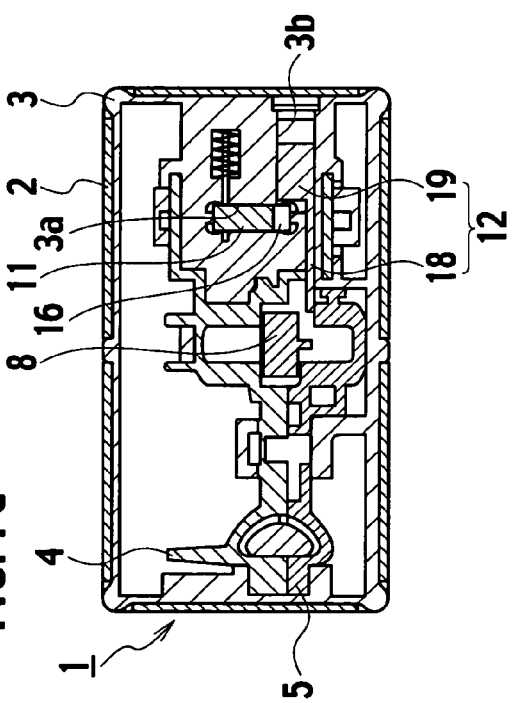
Figure 9:
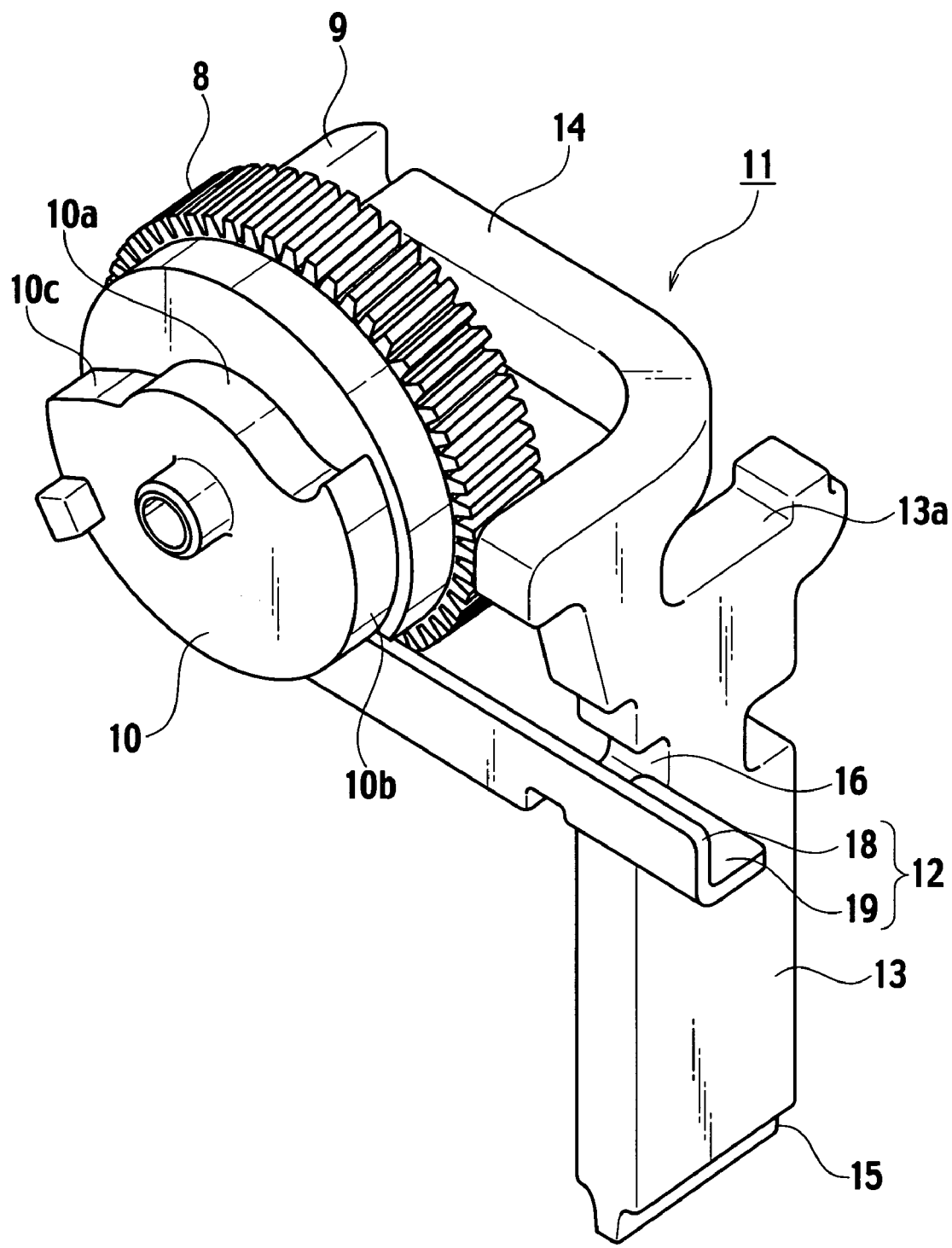
FIG. 9 is a perspective view of a main part illustrating the rotating body (worm wheel), the lock member, and the lever member in the locked status according to the first embodiment of the present invention.
Figure 10:
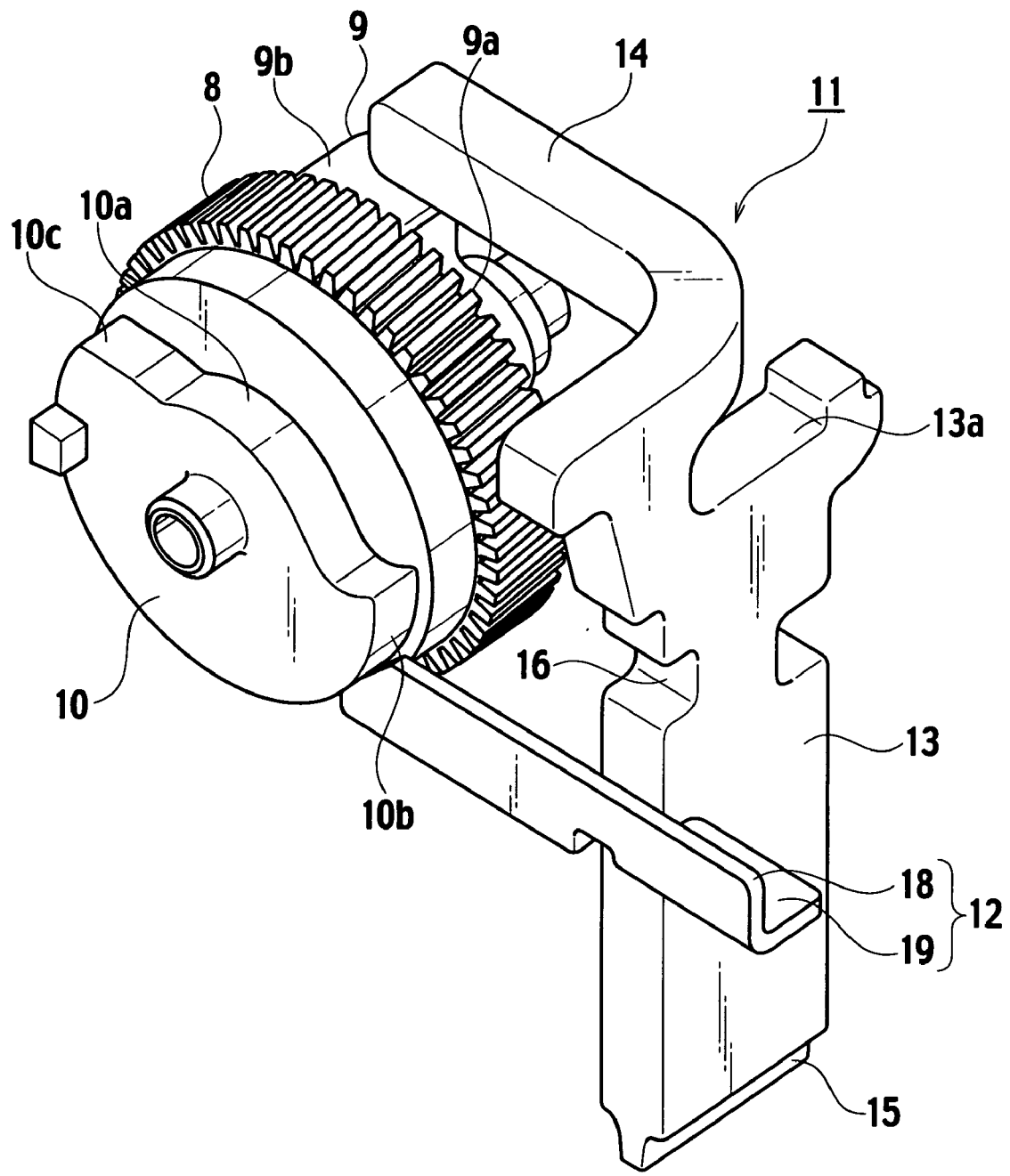
FIG. 10 is a perspective view of the main part illustrating the rotating body (worm wheel), the lock member, and the lever member in the unlocked status according to the first embodiment of the present invention.
Figure 11:
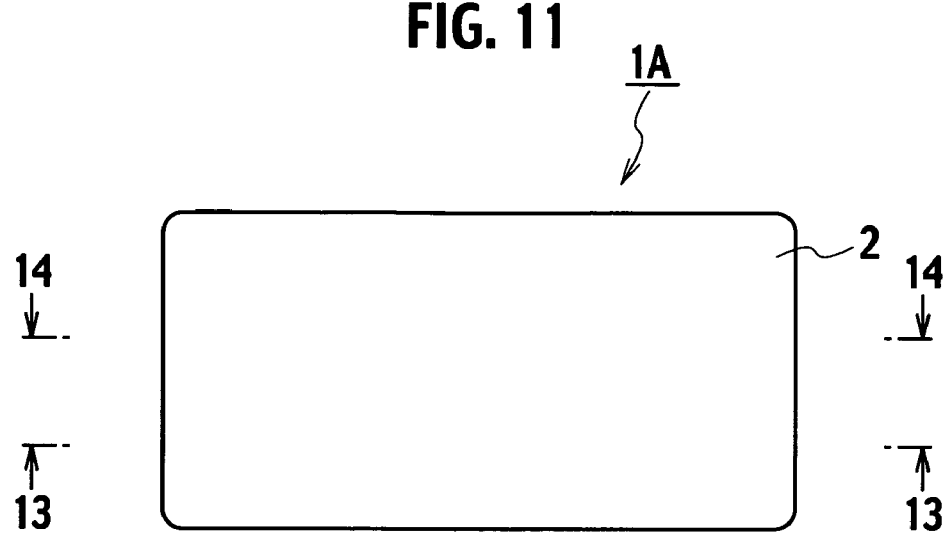
FIG. 11 is a top view illustrating an electric steering lock device according to a second embodiment of the present invention.
Figure 12:
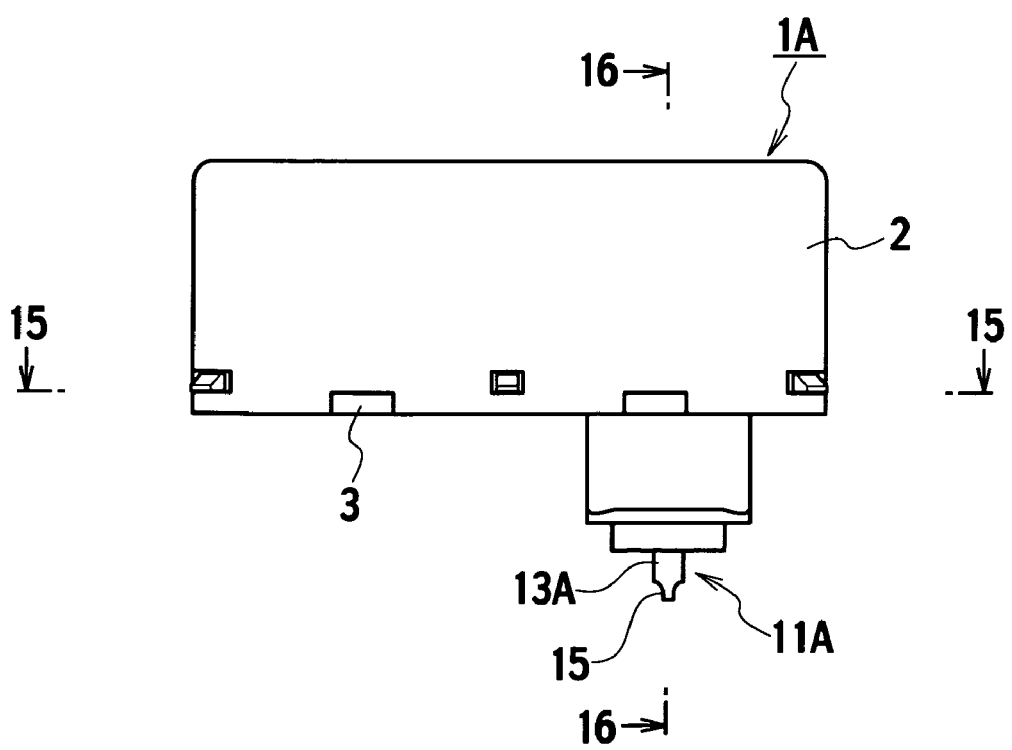
FIG. 12 is a front view illustrating the electric steering lock device according to the second embodiment of the present invention.

As shown in FIGS. 8 to 10, the lock member 11 is composed of: a flat rod section 13 that has a flat plate-like shape and that has a spring-receiving face 13a formed by a notch; a cam engagement section 14 that is protruded in the horizontal direction from the upper side of the flat rod section 13; and a shaft locking protrusion 15 that is provided at a lower end of the flat rod section 13. At one side face of the flat rod section 13, a lock retention engagement groove 16 is provided that extends in a direction orthogonal to the direction along which the lock member 11 is moved. The flat rod section 13 is inserted to a through hole 3a of the housing 3 in a retractable manner and is supported so as to be movable in the up-and-down direction. The shaft locking protrusion 15 provided in the lock member 11 is protruded out of the through hole 3a provided in the housing 3 to the outside. The lock member 11 is displaced between the lock position (the positions of FIGS. 4A, 5A, and 6A) at which the rotation of a steering shaft (not shown) is blocked and the unlock position (the position which is shown in FIGS. 4D, 5D, and 6D) at which the rotation of the steering shaft (not shown) is allowed. The spring-receiving face 13a and the cover 2 have therebetween a first coil spring 17 whose spring force urges the lock member 11 in a direction so as to press the first cam section 9 (locking direction).

The lever member 12 is composed of: a flat plate section 18 that has one end engaged with the second cam section 10 and that is movably provided in the horizontal direction; and an engagement piece 19 that is bent with a right angle from one side of the flat plate section 18 and that is engaged with the lock retention engagement groove 16 when the lock member 11 is moved to the lock position. The lever member 12 is moved between the waiting position at which the lock member 11 is allowed to move (the position which is shown in FIGS. 4D, 5D, 6D, and 7D) and the retention position at which the engagement piece 19 is engaged with the lock retention engagement groove 16 of the lock member 11 to block the lock member 11 from moving to the lock position (the position which is shown in FIGS. 4A, 5A, 6A, and 7A). The lever member 12 is movably inserted to a insertion hole 3b formed in the housing 3 and is urged by a second coil spring 20 towards the second cam section 10.

Next, the operation of the above electric steering lock device 1 will be described. As shown in FIGS. 4A, 5A, 6A, 7A, and 9 when the lock member 11 is locked, the cam engagement section 14 of the lock member 11 is engaged with the lock position area 9a of the first cam section 9. Then, the shaft locking protrusion 15 of the lock member 11 is protruded from the housing 3 and is engaged with a steering shaft (not shown) of the vehicle. This consequently blocks the rotation of the steering shaft to continuously prevent the vehicle from being maneuverable. Then, one end of the lever member 12 is engaged with the retention position area 10*a* of the second cam section 10. This allows the lever member 12 to be moved to the retention position to insert the engagement piece 19 of the lever member 12 to the lock retention engagement groove 16 of the lock member 11. This consequently blocks the lock member 11 from moving to the unlock position.

Next, when the rotation of the motor 6 in the unlocking direction is started, the worm wheel 8 is driven to rotate via the rotating shaft 6*a* and the worm gear 7. Then, as shown in FIGS. 4B, 5B, 6B, and 7B, one end of the lever member 12 is engaged with the lifting area 10*c* of the second cam section 10. This starts the movement of the lever member 12 from the retention position to the waiting position. At this point of time, the engagement piece 19 of the lever member 12 is still being inserted to the lock retention engagement groove 16 of the lock member 11. Thus, the movement of the lock member 11 to the unlock position is blocked.

When the motor 6 is further rotated in the unlocking direction, the cam engagement section 14 of the lock member 11 is engaged with the lifting area 9*c* of the first cam section 9 as shown in FIGS. 4C, 5C, 6C, and 7C. This starts the movement of the lock member 11 from the lock position to the unlock position. At this point of time, the shaft locking protrusion 15 of the lock member 11 is still protruded from the housing 3 and is engaged with the steering shaft and at the same time one end of the lever member 12 is engaged with the waiting position area 10*b* of the second cam section 10. This allows the lever member 12 to be moved to the waiting position to withdraw the engagement piece 19 of the lever member 12 from the lock retention engagement groove 16 of the lock member 11. Thus, the lock member 11 is allowed to move to the unlock position.

Next, when the motor 6 is further rotated in the unlocking direction, the unlocked status as shown in FIGS. 4D, 5D, 6D, 7D, and 10 is reached. This allows the movement of the lock member 11 and the cam engagement section 14 of the lock member 11 is engaged with the unlock position area 9*b* of the first cam section 9. As a result, the lock member 11 is moved to the unlock position and the shaft locking protrusion 15 recedes into the housing 3. This allows the rotation of the steering shaft and the vehicle can be maneuvered.

Next, when the locked status is returned again, the worm wheel 8 is driven by the motor 6 to rotate in the locking direction. Then, the lock member 11 follows the first cam section 9 and is displaced from the unlock position to the lock position. Then, the lever member 12 follows the second cam section 10 and is moved to the retention position at which the lock member 11 is blocked from moving to the unlock position. As a result, the rotation of the steering shaft is blocked and the vehicle cannot be maneuvered.

As described above, according to the first embodiment of the present invention, the lock member 11 is engaged with the steering shaft in a locked status and the engagement piece 19 of the lever member 12 is engaged with the lock retention engagement groove 16 of the lock member 11. This blocks the lock member 11 from moving in the unlocking direction. Thus, the lock member 11 is protected from a so-called soft attack where a small through hole is opened in the cover 2 or the housing 3 for example to directly operate the lock member 11 from outside to move the lock member 11 to the unlock position. This prevents a situation where the locked status of the steering shaft of a parked vehicle is forcedly unlocked and the vehicle is stolen. The lock member 11 is inserted to the through hole 3*a* provided in the housing 3 in a retractable manner, which supports the lock member 11 firmly. This protects the lock member 11 from a destructive behavior where the lock member 11 is operated from outside to forcedly unlock the lock member 11. In view of this protection, the theft protection performance of a parked vehicle can also be improved. Furthermore, even when the first coil spring 17 for urging the lock member 11 in the locking direction during a locked status is removed, the lock member 11 is retained at the lock position by the own weight of the lock member 11. In view of this point, the theft protection performance of a parked vehicle can also be improved.

In the first embodiment, the lever member 12 is covered by the housing 3. Thus, the lever member 12 can be protected from a destructive behavior where the lever member 12 is operated from outside to forcedly unlock the lever member 12.

Furthermore, in the first embodiment, the worm wheel 8 is accommodated in the drive unit room. The worm wheel 8 and the drive unit room are covered by the drive unit housing 4 and the drive unit cover 5 and also are sandwiched between the lock member 11 and the drive unit housing 4. This blocks the worm wheel 8 from being detached from outside. This can protect the worm wheel 8 from a destructive behavior where the worm wheel 8 is operated from outside to be forcedly unlocked. Furthermore, the worm wheel 8 is meshed with the worm gear 7 fixed to the rotating shaft 6*a* of the motor 6, which allows a self lock function of the worm wheel 8 to work when the motor 6 is stopped. This blocks the worm wheel 8 from rotating in the unlocking direction. Thus, the locked status of the steering shaft by the lock member 11 is retained. This can improve the theft protection performance of a parked vehicle.

Next, a second embodiment of the present invention is shown in FIGS. 11 to 17. In FIGS. 11 to 17, the same components as those of FIGS. 2 to 10 are given the same reference numerals, and a redundant description is omitted.

As shown in FIGS. 11 to 17, a electric steering lock device 1A includes, as main configuration parts, a cover 2 and a housing 3 that are assembled to each other to form a part accommodation room at the interior thereof; a drive unit housing 4 and a drive unit cover 5 that are accommodated in the part accommodation room and that further form a drive unit room at the interior thereof; a motor 6 that is a driving source provided in the drive unit room; a worm gear 7 that is fixed to a rotation axis 6*a* of the motor 6; a rotating body (worm wheel) 8 that is meshed with the worm gear 7 and that is rotatably supported in the drive unit room; a first cam section 9 that is integrated with one face of the worm wheel 8; a second cam section 10A that is integrated with the other face of the worm wheel 8; a lock member 11A that moves up and down so as to follow the first cam section 9 (in a direction shown by a arrow a in FIG. 13A); a lever member 12 that slides in a horizontal direction (in a direction shown by a arrow b in FIG. 13A) so as to follow the second cam section 10A; and a circuit substrate (not shown) provided in the part accommodation room.

Figure 13A:
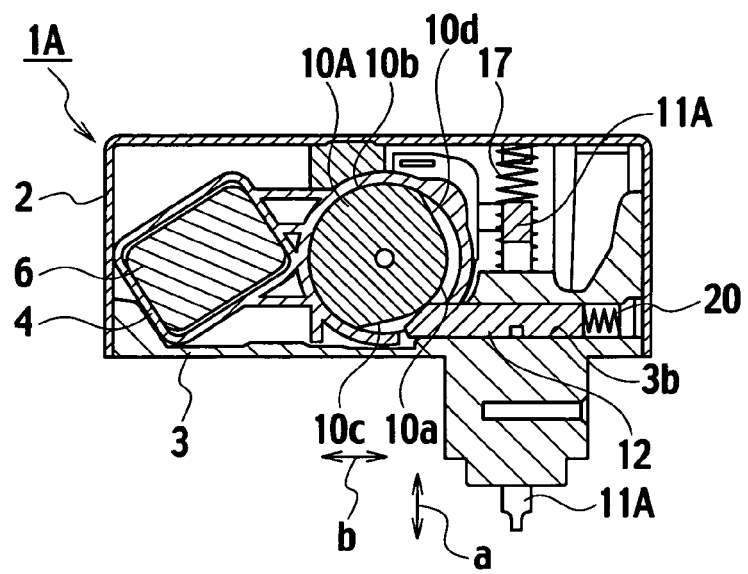
FIGS. 13A to 13C are cross-sectional views illustrating the second embodiment of the present invention taken along a line 13-13 of FIG. 11.
Figure 13B:
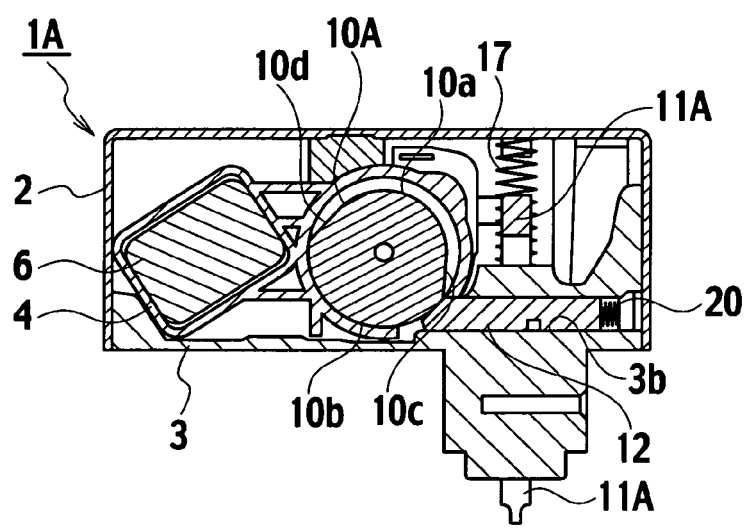
Figure 13C:
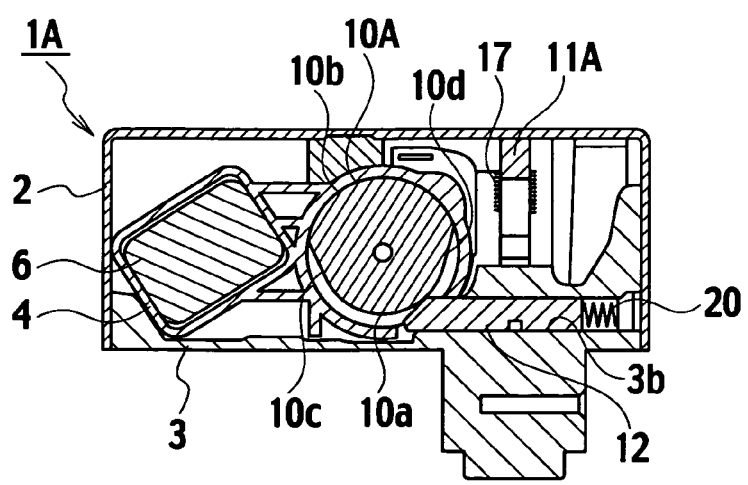
Figure 14A:
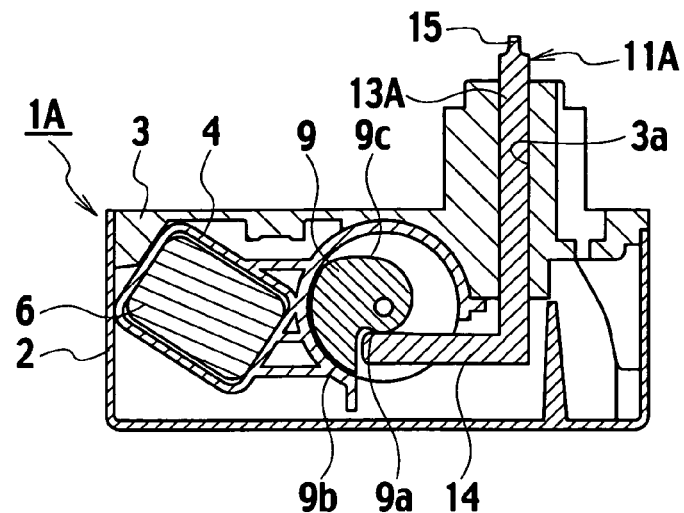
FIGS. 14A to 14C are cross-sectional views illustrating the second embodiment of the present invention taken along a line 14-14 of FIG. 11.
Figure 14B:
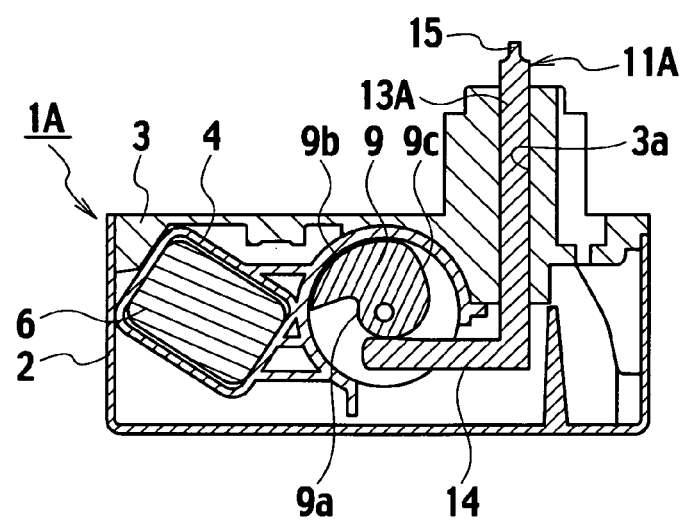
Figure 14C:
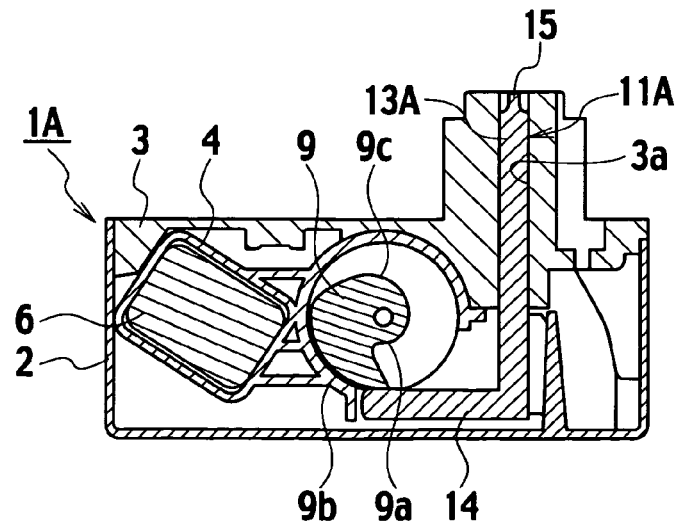
Figure 15A:
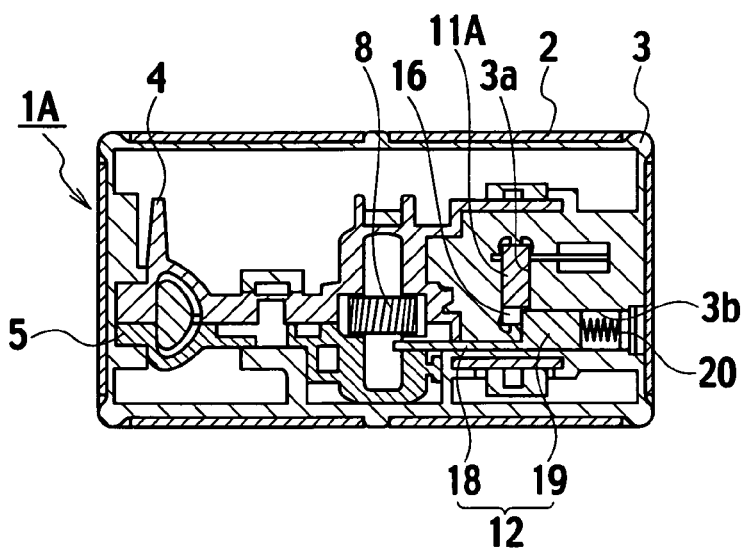
FIGS. 15A to 15C are cross-sectional views illustrating the second embodiment of the present invention taken along a line 15-15 of FIG. 12.
Figure 15B:
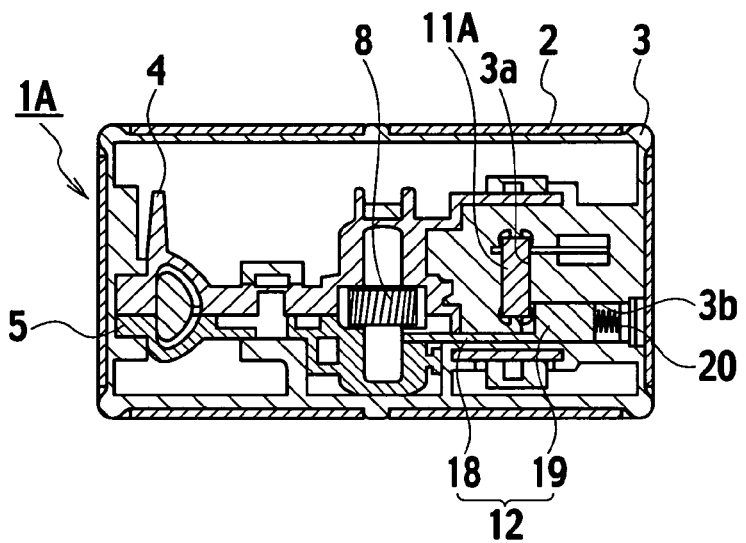
Figure 15C:
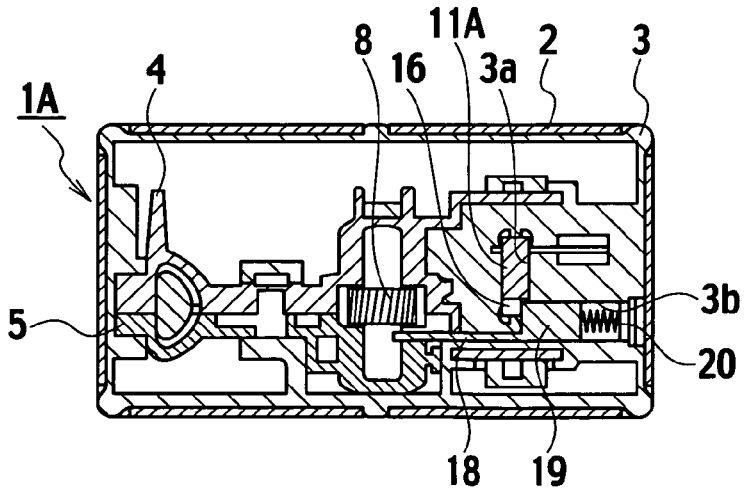
Figure 16A:
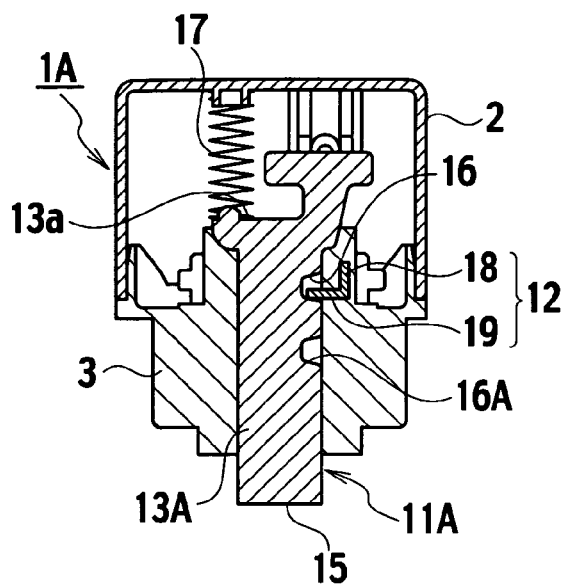
FIGS. 16A to 16C are cross-sectional views illustrating the second embodiment of the present invention taken along a line 16-16 of FIG. 12.
Figure 16B:
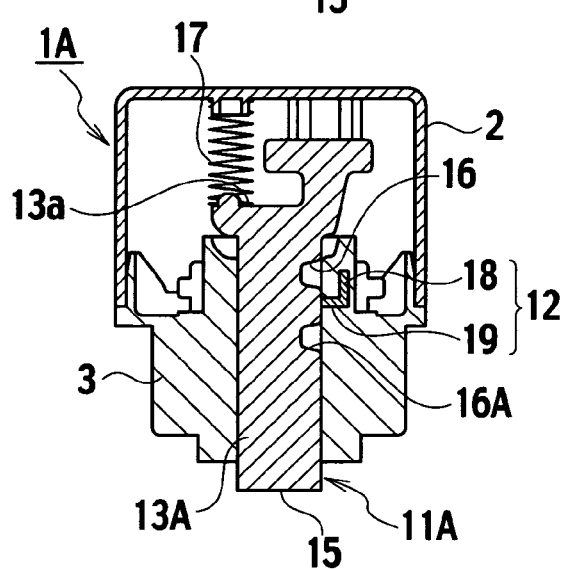
Figure 16C:
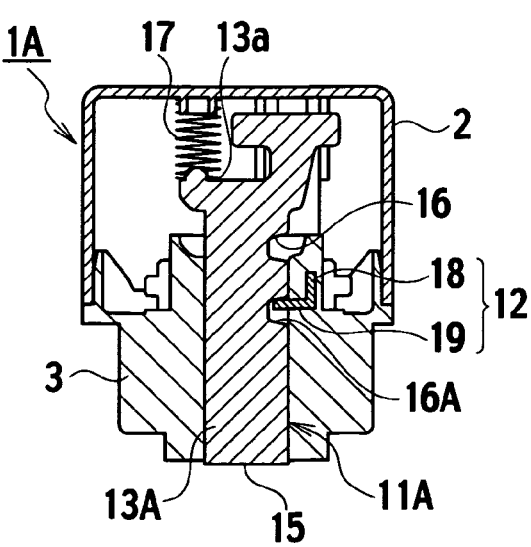

A cam profile of the second cam section 10A is divided, as shown in FIGS. 13A to 13C, to a retention position area 10*a* (a top dead pint) which disposes the lever member 12 in a retention position; a waiting position area 10*b* (a bottom dead pint) which disposes the lever member 12 in a waiting position; and lifting areas 10*c* and 10*d* between the retention position area 10*a* and the waiting position area 10*b*.

Figure 17:
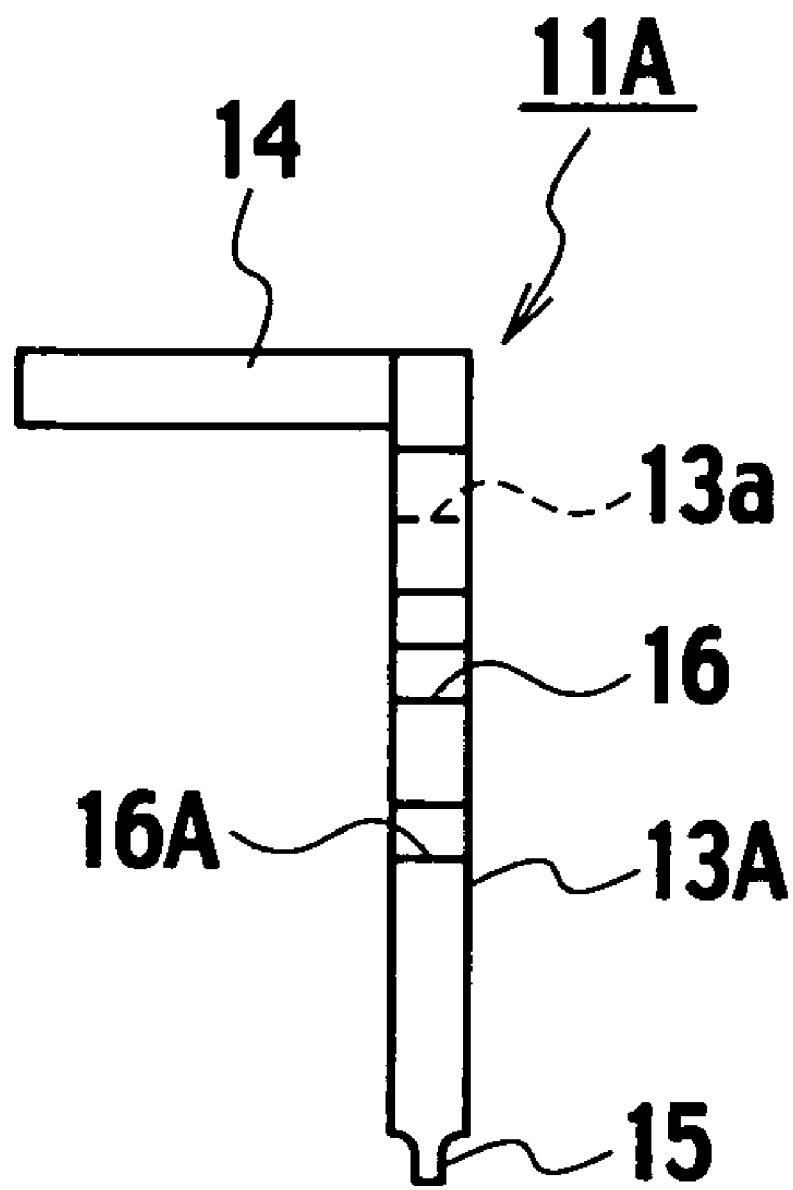
FIG. 17 is a front view illustrating the lock member provided in a steering lock device according to the second embodiment of the present invention.

As shown in FIG. 17, the lock member 11 is composed of: a flat rod section 13A that has a flat plate-like shape and that has a spring-receiving face 13*a* formed by a notch; a cam engagement section 14 that is protruded in the horizontal direction from the upper side of the flat rod section 13A; and a shaft locking protrusion 15 that is provided at a lower end of the flat rod section 13A. At one side face of the flat rod section 13, a lock retention engagement groove 16 and an unlock retention engagement groove 16A, that extend in a direction orthogonal to the direction along which the lock member 11 is moved, are provided with a predetermined distance therebetween. The shaft locking protrusion 15 provided in the lock member 11A is protruded out of the through hole 3a provided in the housing 3 to the outside. The lock member 11A is displaced between the lock position (the position which is shown in FIGS. 13A, 14A, 15A, and 16A) at which the rotation of a steering shaft (not shown) is blocked and the unlock position (the position which is shown in FIGS. 13C, 14C, 15C, and 16C) at which the rotation of the steering shaft (not shown) is allowed. The spring-receiving face 13a and the cover 2 have therebetween a first coil spring 17 whose spring force urges the lock member 11A in a direction so as to press the first cam section 9 (locking direction).

The lever member 12 is composed of: a flat plate section 18 that has one end engaged with the second cam section 10 and that is movably provided in the horizontal direction; and an engagement piece 19 that is bent with a right angle from one side of this flat plate section 18. When the lock member 11A is moved to the lock position, the engagement piece 19 is engaged with the lock retention engagement groove 16. When the lock member 11A is moved to the unlock position, the engagement piece 19 is engaged with the unlock retention engagement groove 16A.

Next, the operation of the above electric steering lock device 1A will be described. As shown in FIGS. 13A, 14A, 15A, and 16A, when the lock member 11A is locked, the cam engagement section 14 of the lock member 11A is engaged with the lock position area 9a of the first cam section 9. Then, the shaft locking protrusion 15 of the lock member 11A is protruded from the housing 3 and is engaged with a steering shaft of the vehicle (not shown). This consequently blocks the rotation of the steering shaft to continuously prevent the vehicle from being maneuverable. Then, one end of the lever member 12 is engaged with the retention position area 10a of the second cam section 10A. This allows the lever member 12 to be moved to the retention position to insert the engagement piece 19 of the lever member 12 to the lock retention engagement groove 16 of the lock member 11A. This consequently blocks the lock member 11A from moving to the unlock position.

Next, when the rotation of the motor 6 in the unlocking direction is started, the worm wheel 8 is driven to rotate via the rotating shaft 6a and the worm gear 7. Then one end of the lever member 12 is engaged with the lifting area 10c of the second cam section 10A. Then, the lever member 12 moves from the retention position to the waiting position. Subsequently, the end of the lever member 12 is engaged with the waiting position area 10b of the second cam 10A, as shown in FIGS. 13B, 14B, 15B, and 16B. Then, the lever member 12 moves to the waiting position, and the engagement piece 19 is disengaged from the lock retention engagement groove 16 of the lock member 11A. Therefore, the lock member 11A is allowed to move towards the unlock position. Moreover, the lifting area 9c of the first cam section 9 is engaged with the cam engagement section 14 of the lock member 11A. Then, the lock member 11A starts to move from the lock position towards the unlock position.

Next, when the motor 6 further rotates in the unlocking direction, the end of the lever 12 is engaged with the other lifting area 10d of the second cam section 10A. Then, the lever member 12 moves from the waiting position towards the retention position. Subsequently, when the steering lock device 1A is brought into the unlocked status as shown in FIGS. 13C, 14C, 15C, and 16C, the cam engagement section 14 of the lock member 11A is engaged with the unlock position area 9b of the first cam section 9. Then, the lock member 11A moves towards the unlock position, and the shaft locking protrusion 15 is retracted into the housing 3. As a result, the steering shaft is allowed to rotate and the vehicle can be maneuvered. At this time, the end of the lever member 12 is engaged with the retention position area 10a of the second cam section 10A. Then, the lever member 12 moves to the retention position, and the engagement piece 19 is inserted into the unlock retention engagement groove 16A of the lock member 11A. Accordingly, the lock member 11A is prevented from moving towards the unlock position.

Subsequently, as shown in FIGS. 13C, 14C, 15C, and 16C, the steering lock device 1A returns from the unlocked status to the locked status again. At this time, the worm wheel 8 is driven by the motor 6 and rotated in the locking direction. Then, the lever member 12 moves from the retention position towards the waiting position so as to follow the second cam section 10A. Simultaneously, the lock member 11A is displaced from the unlock position to the lock position so as to follows the first cam section 9. Then, the lock member 11A comes into the locked status as shown in FIGS. 13A, 14A, 15A, and 16A. At this time, the lever member 12 moves to the retention position. Then, the engagement piece 19 is inserted into the lock retention engagement groove 16 of the lock member 11A. Accordingly, the lock member 11A is prevented form moving towards the unlock position.

In the second embodiment, in addition to the effects of the aforementioned first embodiment, it is possible to prevent the steering shaft from being locked by malfunction of the lock member 11A due to some sort of causes in a driving vehicle. This can prevent the vehicle from going into an unsteerable and dangerous situation, thus improving a so-called vehicle fail-safe performance.

In the second embodiment, the lever member 12 which is driven by the second cam section 10A for liner motion is configured to prevent movement of the lock member 11A. Such a structure enables smaller space than the structure in which a rotating lever member prevents movement of a lock member. In addition, the operation of the lock member 11A is comparatively simple. Accordingly, it is easy to control timings of actions of the lock member 11A, and the lock member 11A can be easily designed.

In the second embodiment, the lock member 11A includes the lock retention engagement groove 16 and unlock retention engagement groove 16A. The engagement piece 19 of the lever member 12 is configured to be engaged separately with the lock retention engagement groove 16 and unlock retention engagement groove 16A of the lock member 11A. The lock member 11A is therefore retained at the lock position or the unlock position. However, it may be configured that the lock member includes a single engagement groove and the lever member includes a lock retention engagement piece and an unlock retention engagement piece. In this case, the engagement groove of the lock member is engaged with each engagement piece of the lever member at the lock position or the unlock position. Even such a configuration can provide similar operational effects to the second embodiment.

What is claimed is:

1. An electric steering lock device, comprising:
   a rotating body that is driven by a driving source to rotate in an unlocking direction and a locking direction;

a first cam section and a second cam section provided in the rotating body;

a lock member that follows the first cam section to be displaced in a direction orthogonal to a rotation axis of the first cam section between a lock position at which the rotation of a steering shaft is blocked and an unlock position at which the rotation of the steering shaft is allowed;

a housing and a cover that form a part accommodation room for accommodating the rotating body, the first cam section, the second cam section, and the lock member; and a lever member that slides, while following the second cam section, so as to be able to be engaged with or disengaged from the lock member, wherein:

the lever member is structured to:

be positioned, when the lock member is positioned at the unlock position, at a waiting position at which the lock member is allowed to move, and be positioned, when the lock member is positioned at the lock position, at a retention position at which the lock member is blocked from being moved to the unlock position.

2. The electric steering lock device according to claim 1, wherein:

the lock member includes a lock retention engagement groove that extends in a direction orthogonal to a direction along which the lock member is moved, and the lever member includes an engagement piece that is engaged with the lock retention engagement groove when the lock member is positioned at the lock position and the lever member is positioned at a retention position.

3. The electric steering lock device according to claim 1, wherein:

the housing includes a through hole to which the lock member can be inserted in a retractable manner.

4. The electric steering lock device according to claim 1, wherein:

the lever member is covered by the housing.

5. The electric steering lock device according to claim 1, further comprising:

a drive unit housing and a drive unit cover which form a drive unit room for accommodating the rotating body.

6. An electric steering lock device, comprising:

a rotating body that is driven by a driving source to rotate in an unlocking direction and a locking direction;

a first cam section and a second cam section provided in the rotating body;

a lock member that follows the first cam section to be displaced in a direction orthogonal to a rotation axis of the first cam section between a lock position at which the rotation of a steering shaft is blocked and an unlock position at which the rotation of the steering shaft is allowed;

a housing and a cover that form a part accommodation room for accommodating the rotating body, the first cam section, the second cam section, and the lock member; and a lever member that slides, while following the second cam section, so as to be able to be engaged with or disengaged from the lock member, wherein:

the lever member is structured to:

be positioned, when the lock member is positioned at the unlock position or the lock position, at a retention position at which the lock member is blocked from being moved to the unlock position, and be positioned, when the lock member is located between the unlock position and the lock position, at a waiting position at which the lock member is allowed to move.

7. The electric steering lock device according to claim 6, wherein:

the lock member includes a lock retention engagement groove and an unlock retention engagement groove which are extending in a direction orthogonal to a moving direction of the lock member, and the lever member includes an engagement piece which is engaged with the lock retention engagement groove or the unlock retention engagement groove when the lock member is positioned at the lock position or the unlocking position and when the lever member is positioned at the retention position.

* * * * *

UNITED STATES PATENT AND TRADEMARK OFFICE
CERTIFICATE OF CORRECTION

PATENT NO. : 7,596,976 B2 Page 1 of 1
APPLICATION NO. : 12/292653
DATED : October 6, 2009
INVENTOR(S) : Koichiro Sugimoto It is certified that error appears in the above-identified patent and that said Letters Patent is hereby corrected as shown below:

Please add in the following on the Title page of the patent:

(30) Foreign Application Priority Data
Nov. 30, 2007 (JP) 2007-310839

Signed and Sealed this

Nineteenth Day of January, 2010

David J. Kappos
*Director of the United States Patent and Trademark Office*